United States Patent
Meneghini

(10) Patent No.: US 8,268,140 B2
(45) Date of Patent: Sep. 18, 2012

(54) SEPARATOR FOR CHLOR-ALKALI ELECTROLYTIC CELLS AND METHOD FOR ITS MANUFACTURING

(75) Inventor: Giovanni Meneghini, Milan (IT)

(73) Assignee: Industrie de Nora S.p.A., Milan (IT)

( * ) Notice: Subject to any disclaimer, the term of this patent is extended or adjusted under 35 U.S.C. 154(b) by 174 days.

(21) Appl. No.: 12/793,177

(22) Filed: Jun. 3, 2010

(65) Prior Publication Data

US 2010/0236922 A1 Sep. 23, 2010

(30) Foreign Application Priority Data

Dec. 4, 2007 (IT) .......................... MI2007A002271
Dec. 3, 2008 (WO) ................. PCT/EP2008/066670

(51) Int. Cl.
*C25B 13/08* (2006.01)
*C25B 13/04* (2006.01)
*C25C 7/04* (2006.01)

(52) U.S. Cl. ....................................... 204/296; 204/295

(58) Field of Classification Search ................... 204/295, 204/296
See application file for complete search history.

(56) References Cited

U.S. PATENT DOCUMENTS

| 4,193,861 | A | | 3/1980 | Kramer et al. | |
|---|---|---|---|---|---|
| 4,253,935 | A | | 3/1981 | Simmons | |
| 4,264,691 | A | | 4/1981 | O'Rell et al. | |
| 4,354,900 | A | | 10/1982 | Bailey et al. | |
| 4,720,334 | A | * | 1/1988 | DuBois et al. | 204/296 |
| 4,853,101 | A | * | 8/1989 | Hruska et al. | 204/296 |
| 5,683,749 | A | * | 11/1997 | DuBois et al. | 427/243 |
| 5,919,348 | A | | 7/1999 | Friedrich et al. | |

FOREIGN PATENT DOCUMENTS

WO 9316217 A2 8/1993

OTHER PUBLICATIONS

International Search Report for PCT/EP2008/066670 dated Jul. 10, 2009, p. 1-6.

* cited by examiner

*Primary Examiner* — Bruce Bell
(74) *Attorney, Agent, or Firm* — Eschweiler & Associates, LLC

(57) ABSTRACT

The invention relates to a synthetic diaphragm for chlor-alkali cells with improved energy consumption and gas separation characteristics. The diaphragm comprises a network of polymer fibers bound to a hydrophilic ceramic material containing zirconium chemically bound to hydroxyl groups. The ceramic material is obtained starting from $ZrO_2$ by a process of hydration under vacuum which can be carried out directly in the cell by means of suitable equipment.

2 Claims, 1 Drawing Sheet

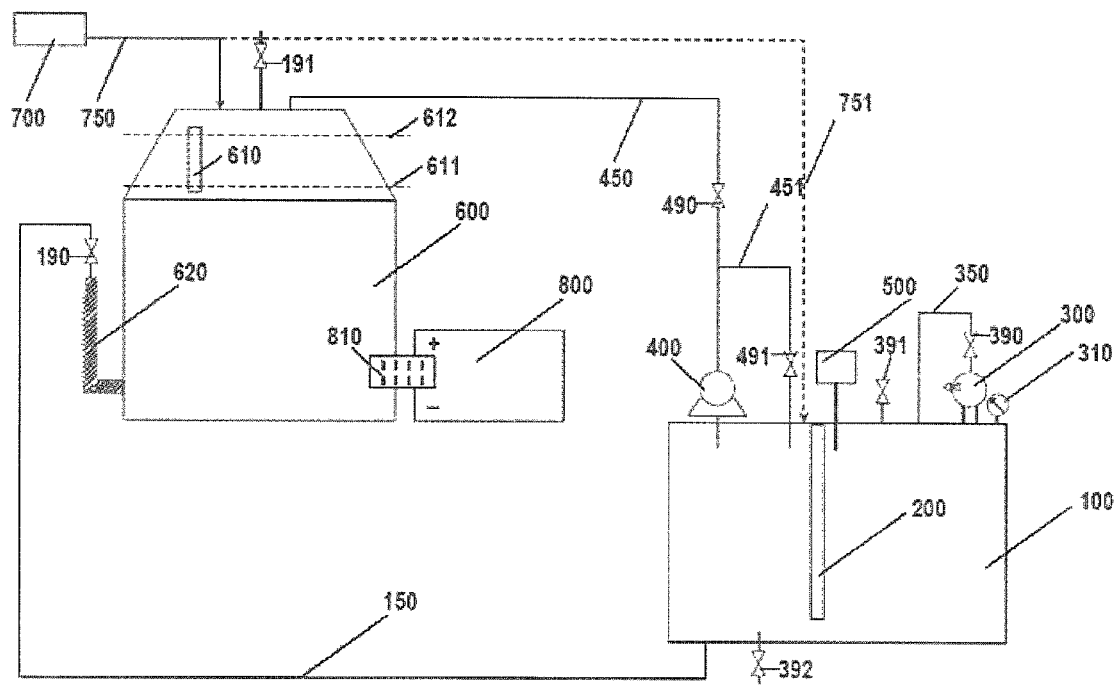

SEPARATOR FOR CHLOR-ALKALI ELECTROLYTIC CELLS AND METHOD FOR ITS MANUFACTURING

CROSS REFERENCE TO RELATED APPLICATIONS

This application is a continuation of PCT/EP2008/066670 filed Dec. 3, 2008, that claims the benefit of the priority date of Italian Patent Application No. MI2007A002271 filed Dec. 4, 2007, the contents of which are herein incorporated by reference in their entirety.

FIELD OF THE INVENTION

The invention relates to a separator for chlor-alkali electrolysis cells, in particular to a diaphragm of the non-asbestos type.

BACKGROUND OF THE INVENTION

Diaphragm electrolytic cells have been employed for a long time in alkali chloride brine electrolysis, such as sodium chloride electrolysis for the production of chlorine and caustic soda. This technology typically provides the deposition of a fibrous semipermeable diaphragm on a multiplicity of foraminous cathodic structures such as meshes or punched sheets and the installation thereof inside an electrolysis cell, intercalated to corresponding anodic structures consisting of valve metals members coated with a catalytic composition for chlorine evolution. Diaphragm fibres were originally based on asbestos, an optimal material from the point of view of permeability and chemical resistance in the usual process conditions, but whose utilisation entails well-known remarkable health hazards. In the course of the last years, attempts have been made to replace asbestos with synthetic fibres having substantially equivalent characteristics. As a matter of fact, the selection of materials of possible use is limited by the highly aggressive reaction environment. In order to obtain a sufficient resistance, in particular to nascent chlorine, at least partially fluorinated polymers were developed, which on the other hand present a rather high hydrophobic character. The latter is a detrimental feature which poses some safety concerns, since it prevents the diaphragm from being adequately soaked with the process electrolyte and from effectively separating the gaseous products formed in the two cell compartments (hydrogen at the cathodic compartment and chlorine at the anodic compartment). Polymer fibres must, therefore, be modified with suitable additives in order to impart the required wettability to the diaphragm.

One example of a commonly employed additive is zirconium oxide, which has been used in the past for asbestos diaphragms. There has been disclosed a zirconium and magnesium oxide-based coating to hydrophilise a polytetrafluoroethylene-based diaphragm, which is still a poorly satisfying solution, leading to a diaphragm imbibition of about 25% of what would be obtained with asbestos fibres.

A much better result can be achieved by directly producing a composite fibre, embedding or encrusting zirconium oxide particles inside, preferably fluorinated organic polymer fibres, as disclosed in U.S. Pat. No. 4,853,101, the contents of which are herein incorporated by reference in their entirety. The diaphragm of U.S. Pat. No. 4,853,101 is manufactured starting from an aqueous suspension of composite anisotropic fibres consisting of a preferably fluorinated polymer (for example PVDF or PTFE) having a consistent amount of zirconium oxide-based ceramic particles mechanically impacted on their surface. The suspension is subsequently deposited on a cathodic structure comprising a foraminous metallic body (for instance a mesh) acting as a filter for the suspension. To accelerate the process, the deposition is normally effected by applying a negative pressure on the opposite side of the cathode body by means of a vacuum pump. In order to stabilise the composite fibres on the cathode surface, an appropriate sintering treatment is carried out at such a temperature that the flowing of polymer particles is started, without reaching the melting or the decomposition point. The fluorinated polymers, for instance, are typically treated at temperatures between 320° C. and 380° C. for a time not exceeding three hours. In full operating regime conditions, the diaphragm of U.S. Pat. No. 4,853,101 presents functioning characteristics slightly inferior to asbestos diaphragms. Nevertheless, the attainment of optimum performances is very slow, delicate and cumbersome. Especially during the lengthy start-up phase, but to some extent also during the regular functioning, the inadequate gas separation due to the residual presence of preferential hydrophobic paths within the diaphragm structure or of capillary pores which the process electrolyte is unable to fill, causes some hydrogen leakage to the anodic compartment, with possible formation of explosive mixtures in the more extreme situations. In some cases, high surfactant concentrations are used in the start-up phase in order to accelerate diaphragm hydrophilization. Typically, the electrolyte is added with an amount up to 5% by volume of Zonyl® (a fluorinated surfactant produced by DuPont, USA), which favours the electrolyte penetration within the pores of the diaphragm, decreasing the hydrophobicity of the polymer fibre, but which is leached out in a short time without offering a definitive solution to the problem.

It would, therefore, be desirable to provide a synthetic separator for diaphragm chlor-alkali cells overcoming the above problems, with particular reference to improving the separation of gaseous products.

SUMMARY OF THE INVENTION

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As provided herein, the invention comprises, under one aspect, a separator for chlor-alkali electrolytic cells comprising a semipermeable diaphragm comprising a sintered network of optionally fluorinated organic polymer fibres incorporating particles of a ceramic material embedded therein, wherein the ceramic material comprises zirconium chemically bound to hydroxyl groups. The ceramic material, having the purpose of ensuring diaphragm wettability and allowing an optimum evacuation of gas from diaphragm pores, is obtainable starting from zirconium oxide subjected to a hydration treatment, optionally followed by an acidic or alkaline washing treatment.

Under another aspect, a method for manufacturing a diaphragm cell cathode coated with a separator comprises the formation of a suspension of optionally fluorinated organic polymer fibres incorporating mechanically bound zirconium oxide, followed by the deposition of such suspension on a foraminous metallic substrate, a thermal treatment for sintering the fibres into a porous reticulated structure, a hydration treatment under negative pressure and an optional acidic or alkaline washing treatment. In one embodiment, the fibre deposition and sintering are carried out after installing the diaphragm-coated cathode in a diaphragm electrolysis cell.

Under another aspect, equipment for the execution of a hydration treatment and optionally an acidic or alkaline washing treatment on a separator for electrolysis cells comprises a tank for holding a solution, optionally provided with a visual level control, a vacuum pump optionally provided with a manometer to apply a negative pressure to the tank, a recycle pump, a means for hydraulically connecting the tank to the cell containing the separator to be conditioned.

Under a further aspect, a method for washing a previously operated diaphragm-coated cathode from impurities comprises soaking the diaphragm with a solution at pH lower than 2 or higher than 12 at a temperature comprised between 40° C. and 100° C. under negative pressure.

To the accomplishment of the foregoing and related ends, the following description sets forth certain illustrative aspects and implementations. These are indicative of but a few of the various ways in which one or more aspects may be employed. Other aspects, advantages, and novel features of the disclosure will become apparent from the following detailed description.

BRIEF DESCRIPTION OF THE DRAWING FIGURES

FIG. 1 illustrates one embodiment of conditioning equipment connected to a chlor-alkali electrolysis cell.

DETAILED DESCRIPTION

The separator of the invention comprises a semipermeable diaphragm comprising a sintered network of organic polymer fibres, such fibres incorporating mechanically bound particles of ceramic material, such ceramic material comprising zirconium chemically bound to hydroxyl groups. The separator can be obtained by subjecting a diaphragm comprising fibres modified with zirconium oxide particles to a permanent hydration treatment. The inventors found that the functioning defects of the diaphragm of U.S. Pat. No. 4,853,101 can be attributed to the scarce hydrophilicity of zirconium oxide particles after the sintering treatment required for mechanically stabilising the polymer structure. In the prior art teaching, the diaphragm is soaked during the start-up phase with a remarkable amount of surfactants, in order to depress the overall hydrophobicity of the polymer structure, thereby forcing the penetration of process electrolyte inside the pores. Following the forced imbibition with electrolyte, after a few hundred hours of operation, the hydrophobic characteristics of zirconium oxide are mitigated, but not to a sufficient extent. Once the surfactant is completely leached out of the diaphragm pores, a gas build-up occurs again, diminishing the electrical characteristics and favoring the diffusion of cathodically-evolved hydrogen to the anodic compartment, with the associated safety risks.

The separator according to the invention conversely comprises zirconium particles forming chemically stable bonds with hydroxyl groups, thereby acquiring a remarkable permanent hydrophobic character. The inventors have observed that the formation of stable Zr—O—H bonds (easily detectable by spectrophotometry, for instance by infrared technique, as it will be evident to one skilled in the art) leads to electrochemical performances—in terms of operative voltage, faradic efficiency and purity of product chlorine—at least equivalent to those obtainable with asbestos diaphragms. The separator according to the invention comprises organic polymer fibres which can be of the perfluorinated type (for example PVDF or PTFE), presenting all the advantages of the fluorinated polymers in terms of chemical stability without being affected by the high hydrophobicity of such polymers.

In one embodiment, the separator according to the invention is produced starting from a suspension of optionally fluorinated organic polymer fibres incorporating mechanically bound zirconium oxide, deposited on a foraminous metal substrate, with execution of a subsequent thermal sintering treatment of the deposited fibres to form a porous reticulated structure. The thus obtained sintered diaphragm is then further subjected to a soaking and hydration treatment under negative pressure in a hydrating solution at temperature above ambient (40° C.-100° C.) for at least one hour. The hydrating solution can optionally include water. By treatment under negative pressure of a cathode-deposited diaphragm it is intended, throughout the present specification, that a negative pressure is applied from the side of the foraminous cathode substrate opposite the one coated with the diaphragm, as in a sort of vacuum filtration.

The above method provides diaphragms with optimum performances even starting from fluorinated polymers, which are known to require sintering treatments at very high temperature (about 320° C.-about 380° C.) and hence give rise to the formation of a scarcely hydrophilic zirconium oxide. The hydrating solution used for the formation of the Zr—O—H bonds can be a mildly alkaline solution, of pH comprised between about 9 and about 12. In order to facilitate the initial step of the hydration treatment, it is possible to add a modest amount of surfactant to the hydrating solution, for instance about 0.1 to about 5% by weight, depending on the type of surfactant. For instance, it is still possible to employ a fluorinated surfactant such as Zonyl®, produced by DuPont, in a quantity normally not exceeding 1% (0.1-0.2% by weight being normally sufficient). The application of the treatment at negative pressure conditions (below about 60 kilopascals (kPa) of absolute pressure) can have the advantage of effectively withdrawing air from the diaphragm pores, accelerating the soaking thereof with hydrating solution.

In one embodiment, the step of diaphragm soaking in the hydrating solution is performed in two stages. A first stage, of duration comprised between about 30 minutes and about 180 minutes, is carried out at moderate temperature (about 50° C.-about 70° C.) applying a negative pressure (for example an absolute pressure of about 5 kPA to about 50 kPa) until completing air withdrawal from the pores and diaphragm soaking. It is in this phase that the optional addition of a surfactant can help accelerate the process. In a subsequent stage, which in one embodiment has a duration of at least about 8 hours (for example 12 to 16 hours), the temperature is increased to at least about 80° C., optionally under a lower negative pressure or under a slight positive pressure (for instance between about 35 and about 120 kPa). This process stage leads to the conversion of the $ZrO_2$ species and to the formation of the Zr—O—H bonds imparting optimum wettability characteristics to the diaphragm.

In one embodiment, diaphragm hydration is followed by a washing step with a washing solution, for instance with water. In one embodiment, the washing solution is either strongly acidic (with a pH not higher than 2) or strongly alkaline (with a pH not lower than 12). The washing step can help cleanse the diaphragm pores from surfactant traces and also from impurities that may precipitate following the hydration treatment, and can thus also be carried out before the first start-up. The hydration treatment may bring about a clogging of the diaphragm porosity, for instance, due to traces of ions such as calcium, magnesium, iron or aluminium forming scarcely soluble hydroxides or salts at mildly basic pH. Depending on the nature of the impurities present, it can be more convenient to carry out a washing in strongly acidic or strongly alkaline conditions. In some cases, the washing can be effected with the process brine to be later electrolysed. Also, the washing step is commonly carried out at a temperature higher than ambient (40° C.-100° C.), optionally under negative pressure (5-60 kPa). This washing treatment proves effective also for diaphragms of the prior art poisoned with impurities, either accidentally or due to a prolonged operation, and can therefore be periodically repeated. Since during operation the diaphragm is normally subjected to a mildly acidic environment on the anodic side and to a highly alkaline one on the cathodic side, the impurities precipitating in its interior can be of a most diverse nature (for instance precipitates containing Ca, Mg, Fe, Ni, Al, $SiO_2$). For this reason, choosing to carry out a washing with an acidic solution, at pH not higher than 2, or with an alkaline one, at pH not lower than 12, can be evaluated case by case as will be evident to one skilled in the art. Both of the above conditioning steps, that is the hydration step and the optional washing step, can be either effected in an appropriate unit or directly in the electrolysis cell equipped with the diaphragm. Carrying out the washing step directly in the electrolysis cell, for instance, can be more practical than in an external unit.

In one embodiment, the unit where the diaphragm to be subjected to hydration and/or washing is assembled, comprising an external unit or of the electrolysis cell itself, is connected to an appropriate conditioning equipment comprising a tank for holding a solution optionally provided with a level visual check, a vacuum pump suitable for applying a negative pressure to the tank, such pump being optionally provided with a manometer, and a recycling pump for the solution and suitable structure for the hydraulic connection of the tank with the unit containing the separator to be conditioned. The tank must be fabricated with a material resistant to the process conditions (especially in terms of pH and temperature) and can be equipped with a device for achieving and maintaining the required temperature.

In one embodiment, the conditioning equipment is mounted on handling apparatus, for instance on a cart. This can have the advantage of facilitating its sequential use on different electrolysis cells of a chlor-alkali production plant, following the installation of new diaphragms or when a periodic or an occasional washing of used diaphragms is needed. In another embodiment, the conditioning equipment is fixed and the treatment to the individual cells is made possible by a suitable manifold.

The invention will be better understood making reference to the attached drawing, provided as a non-limiting illustration of an embodiment thereof. Turning to FIG. 1, there is illustrated an embodiment of conditioning equipment connected to a diaphragm chlor-alkali electrolysis cell, wherein the hydration and optionally the washing treatment of a separator are carried out. It will be evident to one skilled in the art how the same kind of equipment can be interfaced with an external conditioning unit, wherein the same separator can be provisionally installed before the final cell assemblage.

The equipment shown in the drawing comprises one tank 100, which can be loaded with the solution to be used in the treatment as previously described. The filling level can be checked by, for example, visual control 200. Tank 100 is hydraulically connected to the mobile outlet pipe 620 of the diaphragm chlor-alkali cell 600 through line 150. Tank 100 is also equipped with a vacuum pump 300 provided with manometer 310, with recycling pump 400 connected through line 450 to the anodic compartment of diaphragm cell 600 and with a pH probe 500. Tank 100 is further equipped with a mechanism for heating the solution, not shown.

Chlor-alkali cell 600, in whose interior is typically installed a multiplicity of cathodes coated with the diaphragms to be conditioned intercalated with a multiplicity of anodes, can be fed at the anodic compartment with the solution stored in tank 100 by means of pump 400 through line 450, or with alkali chloride brine—for instance sodium chloride—of suitable purity degree 700 through line 750. Line 751 is optionally used for feeding tank 100 during the conditioning steps carried out with process electrolyte. Tank 100 is also provided with apparatus for supplying different solutions, not shown, for instance of a hydrating solution to accomplish the relevant diaphragm soaking step or of hydrochloric acid for pH adjustment. The filling level of the cathodic compartment of cell 600 with alkali chloride brine 700 is adjusted by visual control 610. Levels 611 and 612 schematically represent the minimum and maximum filling levels. The connection or disconnection of cell 600 to the electric power 800 is achieved by jumper switch 810.

The meaning of the remaining elements indicated in the drawing will be obvious to one skilled in the art, in particular: 390 indicates a valve for varying the level of vacuum applied to tank 100 by pump 300, and 391 indicates the valve allowing to put the cell in communication with the external environment or to isolate it therefrom; 392 indicates the valve for discharging the solution contained in tank 100; 490 and 491 indicate the interception valves, respectively, on line 450 connecting tank 100 to diaphragm cell 600 and on recycling line 451 of pump 400 to tank 100; 190 indicates the interception valve on line 150 connecting tank 100 to mobile outlet pipe 620 and 191 indicate the valve allowing to connect the anodic compartment of cell 600 to the external environment.

EXAMPLE

Two diaphragm cells of a chlor-alkali plant were equipped with cathodes provided with a separator based on PTFE fibre with zirconium oxide sintered at 360° C. in accordance with U.S. Pat. No. 4,853,101 and intercalated to an equal number of titanium anodes provided with a ruthenium and titanium oxide-based catalytic coating. A first cell, labelled as reference cell, was equipped with diaphragms previously soaked in a sodium chloride brine at pH 10 containing 4% by weight of Zonyl® fluorinated surfactant according to the prior art. The start-up of reference cell was carried out in accordance with the prior art.

A second cell, labelled as cell according to the invention, was equipped with diaphragms not treated any further after the sintering cycle and interfaced with a conditioning equipment as shown in the drawing, mounted on a cart. During the first treatment step, the cell was placed outside the production line. In a different embodiment, the cell may be installed in the production line, with jumper switch 810 in the off position so as to guarantee the total bypass of electrical current.

Tank 100 was loaded with a hydrating solution at pH 11, containing an amount of 0.1% of Zonyl®. The anodic compartment of cell 600 was filled with the hydrating solution of tank 100 to the maximum level 612 and the heating of the hydrating solution was started. A diaphragm soaking step under negative-pressure conditions was then carried out, articulated in two stages: in a first stage, lasting about 90 minutes, pump 300 was turned on, bringing tank 100 at a pressure of 85 kPa by acting on valve 390, then valve 191 and, slowly, valve 190 were opened, until reaching a pressure of 45 kPa in the cathodic compartment of cell 600. The solution thereby recalled from the anodic to the cathodic compartment effected the soaking of diaphragms, being later sent to tank 100 through mobile pipe 620. Meanwhile, the negative-pressure conditions in the cathodic compartment favoured the stripping of air from diaphragm pores.

During the procedure, the time required for the anolyte to pass from maximum level 612 to minimum level 611, which is a direct function of permeability and thus of diaphragm soaking degree, was measured. The above procedure was repeated three times, each time filling up cell 600 by means of pump 400 up to maximum level 612, until reaching an approximately constant drop time from maximum level 612 to minimum level 611 and an absolute pressure of 25 kPa. During the whole of this first stage, the temperature rose slowly, until reaching 70° C. In a second stage, of overall twelve hours duration, the temperature of the circulating hydrating solution was brought to 90° C. and the absolute pressure was set to 60 kPa. The connection of the anodic compartment to the external environment was then closed, with consequent interruption of the circulation, by closing valve 191 and transferring the same 60 kPa pressure to the anodic compartment.

In a different embodiment, the above described second stage can be carried out at ambient pressure, keeping valve 191 open and adjusting the flow-rate of hydrating solution sent through line 450 by means of valves 490 and 491 in order to keep maximum level 612 constant. In this case, the hydration solution flow-rate at the outlet of mobile pipe 620 would correspond to that of the same solution in line 450. In the course of this cycle, the conversion of poorly hydrophilic $ZrO_2$ is accomplished, with formation of stable Zr—O—H chemical bonds and the attainment of a highly hydrophilic character.

The solution was allowed to cool down to 50° C., and another short soaking step was carried out at such temperature, much in the same way as previously described, imposing an absolute pressure of 60 kPa to tank 100 by means of pump 300, opening valve 390 and keeping valves 190, 391, 490 and 491 closed. Subsequently, valve 191 and, slowly, valve 190 were opened in order to transfer the 60 kPa negative pressure to the cathodic compartment. The solution was allowed to flow across the diaphragm to the cathodic compartment, then from mobile pipe 620 to tank 100 along line 150, until reaching minimum level 611 in the anodic compartment. The procedure was repeated three more times after bringing the solution in tank 100 to pH 2 by hydrochloric acid addition under control of probe 500 (washing solution). In this way, cleansing of the hydrated diaphragm from the surfactant and from possible impurities precipitated as hydroxides or salts poorly soluble in a mildly alkaline environment was achieved. The cell was then detached from the conditioning equipment by disconnecting lines 150 and 450 and valve 190, filled up with process brine and started up.

After 90 days of operation the cell according to the invention and the reference cell were functioning with the following parameters:
Cell According to the Invention
Voltage at 2.5 $kA/m^2$: 3.35 V
Current efficiency: 96%
Energy consumption: 2638 kWh per tonne of chlorine
$H_2$ in product $Cl_2$: 0.06%
Reference Cell:
Voltage at 2.5 $kA/m^2$: 3.40 V
Current efficiency: 93%
Energy consumption: 2810 kWh per tonne of chlorine
$H_2$ in product $Cl_2$: 0.1%

After ninety days of operation, the inlet brine was contaminated with 5 ppm calcium ions and 1 ppm magnesium ions, in order to simulate a malfunctioning on the purification lines of the plant. The experiment can be also viewed as an accelerated life-test, since the effect is the same that would be obtained after a prolonged operation of several months with brine within the specifications. Both cells had a significant drop in current efficiency, which reached approximately 90%, and a voltage increase of about 0.1 V with consequent increase of energy consumption.

A new washing treatment was then effected. Cell 600 was shut down according to the standard procedures, discontinuing the power supply by acting on jumper switch 810 and draining the electrolyte through mobile pipe 620, lowered to the minimum level. The connections with the conditioning equipment (valves 190 and 490 and lines 150 and 450) were then restored. A washing solution was prepared comprising sodium chloride brine at pH 1 in tank 100, adding hydrochloric acid to the process brine based on the reading of pH probe 500, recycling it though pump 400, with valve 491 open. After reaching pH 1, valve 491 was shut again and valves 490 and 191 were opened, filling cell 600 with the acidic brine of tank 100 by pump 400. By operating pump 300, pressure was brought to 85 kPa, then valve 190 was opened until establishing a 50 kPa negative pressure. The acidic brine was allowed to flow across the diaphragm to the cathodic compartment, then from mobile pipe 620 to tank 100 along line 150, until attaining minimum level 611 in the anodic compartment. The operation was repeated two more times, checking the drop time from maximum level 612 to minimum level 611 and analysing impurities at the outlet. The washing brine was then discharged from tank 100 through valve 392, and the cell was refilled and started up.

The same washing procedures were repeated in the same sequence on the reference cell, after moving the conditioning equipment nearby utilizing the relevant cart.

90 days after washing, the two cells were in function according to the following parameters:
Cell According to the Invention
Voltage at 2.5 $kA/m^2$: 3.37 V
Current efficiency: 96%
Energy consumption: 2653 kWh per tonne of chlorine
$H_2$ in product $Cl_2$: n.d.
Reference Cell:
Voltage at 2.5 $kA/m^2$: 3.45 V
Current efficiency: 94%
Energy consumption: 2770 kWh per tonne of chlorine
$H_2$ in product $Cl_2$: 0.1%

The washing procedure on a used diaphragm is hence capable of bringing the diaphragm of the invention back to the starting operation conditions, but proves advantageous also for a diaphragm of the prior art, bringing the performances thereof to even higher levels than before fouling.

The previous description is not intended to limit the invention, which may be used according to different embodiments without departing from the scope thereof, and whose extent is univocally defined by the appended claims. Throughout the description and claims of the present application, the term "comprise" and variations thereof such as "comprising" and "comprises" are not intended to exclude the presence of other elements or additives.

The discussion of documents, acts, materials, devices, articles and the like is included in this specification solely for the purpose of providing a context for the invention. It is not suggested or represented that any or all of these matters formed part of the prior art base or were common general knowledge in the field relevant to the present invention before the priority date of each claim of this application.

The invention claimed is:

1. Separator for chlor-alkali electrolysis cells comprising ceramic material particles mechanically bound to a network of organic polymer fibres by embedding into a sintered network of the fibres, the ceramic material particles comprising zirconium chemically bound to hydroxyl groups.

2. The separator according to claim 1, the organic polymer comprising a fluorinated polymer.

\* \* \* \* \*